United States Patent
Chuang

(10) Patent No.: US 10,220,249 B1
(45) Date of Patent: Mar. 5, 2019

(54) TREADMILL WITH A TRACK-TYPE WALKING BELT

(71) Applicant: HIGH SPOT HEALTH TECHNOLOGY CO., LTD., Taichung (TW)

(72) Inventor: Yen-Chi Chuang, Taichung (TW)

(73) Assignee: High Spot Health Technology Co., Ltd., Taichung (TW)

( * ) Notice: Subject to any disclaimer, the term of this patent is extended or adjusted under 35 U.S.C. 154(b) by 0 days.

(21) Appl. No.: 15/784,244

(22) Filed: Oct. 16, 2017

(51) Int. Cl.
*A63B 22/02* (2006.01)
*B65G 23/06* (2006.01)
*B65G 17/06* (2006.01)
*B65G 17/42* (2006.01)

(52) U.S. Cl.
CPC .......... *A63B 22/02* (2013.01); *A63B 22/0285* (2013.01); *B65G 17/067* (2013.01); *B65G 17/42* (2013.01); *B65G 23/06* (2013.01)

(58) Field of Classification Search
None
See application file for complete search history.

(56) References Cited

U.S. PATENT DOCUMENTS

| | | | | |
|---|---|---|---|---|
| 4,205,628 A * | 6/1980 | Null | ..................... | A01K 15/027 119/700 |
| 4,361,115 A * | 11/1982 | Pike | ..................... | A01K 15/027 119/700 |
| 4,687,195 A * | 8/1987 | Potts | ..................... | A63B 21/015 482/52 |
| 6,042,514 A * | 3/2000 | Abelbeck | ............... | A63B 22/02 198/439 |
| 7,510,511 B2 * | 3/2009 | von Detten | ............ | A63B 22/02 482/54 |
| 7,780,573 B1 * | 8/2010 | Carmein | ............ | A63B 22/0242 482/4 |
| 7,976,437 B1 * | 7/2011 | Von Detten | ........ | A63B 22/0235 482/54 |
| 8,734,301 B2 * | 5/2014 | Remelius | ........... | A63B 22/0235 198/388 |
| 9,833,657 B2 * | 12/2017 | Wagner | .................. | A63B 22/02 |

\* cited by examiner

*Primary Examiner* — Stephen R Crow
(74) *Attorney, Agent, or Firm* — Alan D. Kamrath; Kamrath IP Lawfirm, P.A.

(57) ABSTRACT

A treadmill includes a frame having two sides each provided with two sprockets, two slide rails mounted on the two sides of the frame, two chains engaging with the two sprockets at the two sides of the frame respectively and corresponding to the two slide rails respectively, a plurality of elongate board mounted between the two chains, and a plurality of rollers mounted on each of the two chains. Each of the elongate board has two ends each provided with a connecting member connected with one of the two chains. The rollers on each of the two chains rest on one of the two slide rails. Thus, when the two chains are rotated, the rollers on each of the two chains slide on one of the two slide rails.

10 Claims, 6 Drawing Sheets

TREADMILL WITH A TRACK-TYPE WALKING BELT

BACKGROUND OF THE INVENTION

1. Field of the Invention

The present invention relates to an exercising device and, more particularly, to a treadmill.

2. Description of the Related Art

A conventional treadmill comprises a track-type walking belt and a transmission mechanism for driving and rotating the walking belt. The transmission mechanism includes a plurality of rolling members located at two sides of the walking belt. The transmission mechanism further includes a pair of front rotation members and a pair of rear rotation members mounted on two opposite ends of a support rack. The walking belt is mounted around the front rotation members and the rear rotation members to rotate in an endless manner. Each of the front rotation members has a periphery provided with a plurality of recessed portions. Each of the recessed portions has an outside provided with an opening with a diameter smaller than that of each of the recessed portions. Each of the rolling members is received in one of the recessed portions and has a screwing member with a head received in the respective opening. However, each of the rolling members is a ball bearing made of iron, thereby increasing the cost of fabrication. In addition, each of the front rotation members is formed with the recessed portions and the openings by a lathe working procedure, thereby increasing the working cost.

BRIEF SUMMARY OF THE INVENTION

The primary objective of the present invention is to provide a treadmill with a track-type walking belt.

In accordance with the present invention, there is provided a treadmill comprising a frame having two sides each provided with two sprockets, two slide rails mounted on the two sides of the frame, two chains engaging with the two sprockets at the two sides of the frame respectively and corresponding to the two slide rails respectively, a plurality of elongate board mounted between the two chains, and a plurality of rollers mounted on each of the two chains. Each of the elongate board has two ends each provided with a connecting member connected with one of the two chains. The rollers on each of the two chains rest on one of the two slide rails. When the two chains are rotated, the rollers on each of the two chains slide on one of the two slide rails. Each of the two chains includes a plurality of chain sets. Each of the chain sets includes two first inner plates mounted on the respective connecting member of one of the elongate board, two second inner plates spaced from the two first inner plates, two reinforcing spacers each mounted between one of the two first inner plates and one of the two second inner plates, an outer plate linking the two second inner plates, and two shafts each extending through the outer plate, one of the two second inner plates, one of the two reinforcing spacers, one of the two first inner plates and the respective connecting member of one of the elongate board.

According to the primary advantage of the present invention, the two chains engage with the two sprockets at the two sides of the frame respectively, while the rollers are mounted on each of the two chains and slide on one of the two slide rails, so that the treadmill has a track-type walking belt that has rotation and transmission of high precision and stability.

According to another advantage of the present invention, each of the two chains has a stabilized structure and is not worn out easily during a long-term utilization, thereby enhancing the lifetime of the treadmill, and thereby reducing the cost of maintenance.

According to a further advantage of the present invention, the sprockets are manufactured by stamping easily and simply, without needing a lathe working of a high price, thereby greatly decreasing the cost of fabrication.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
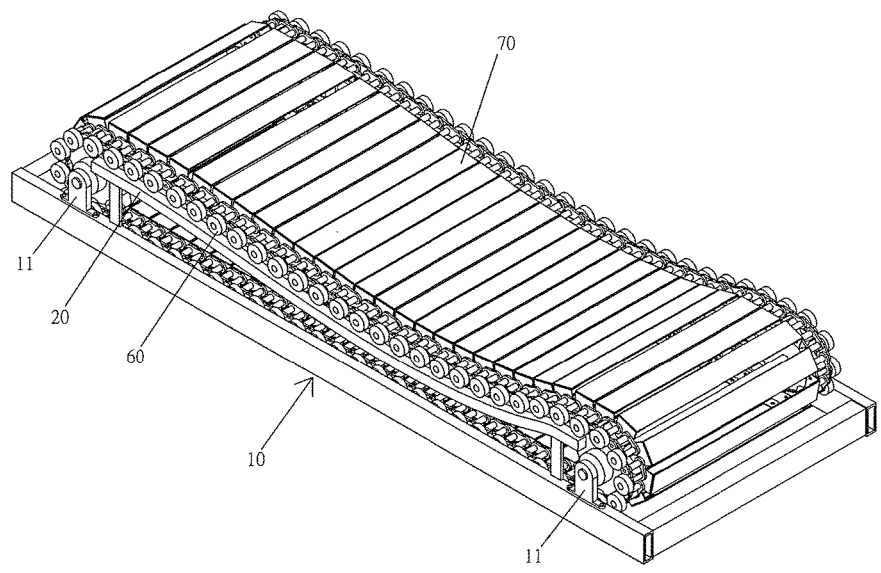
FIG. 1 is a perspective view of a treadmill in accordance with the preferred embodiment of the present invention.
Figure 2:
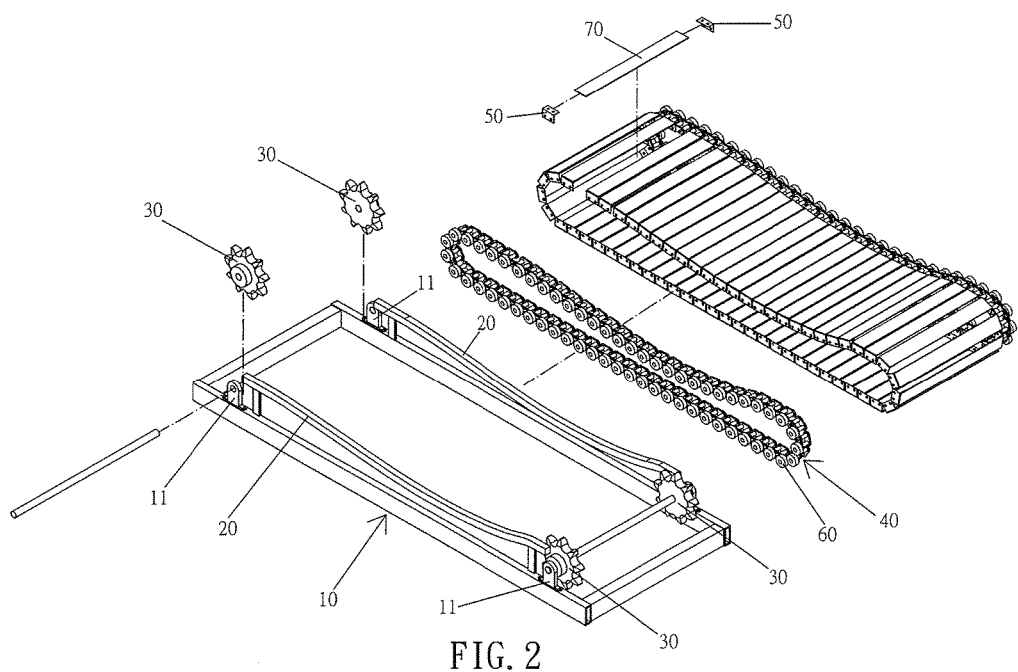
FIG. 2 is an exploded perspective view of the treadmill in accordance with the preferred embodiment of the present invention.
Figure 3:
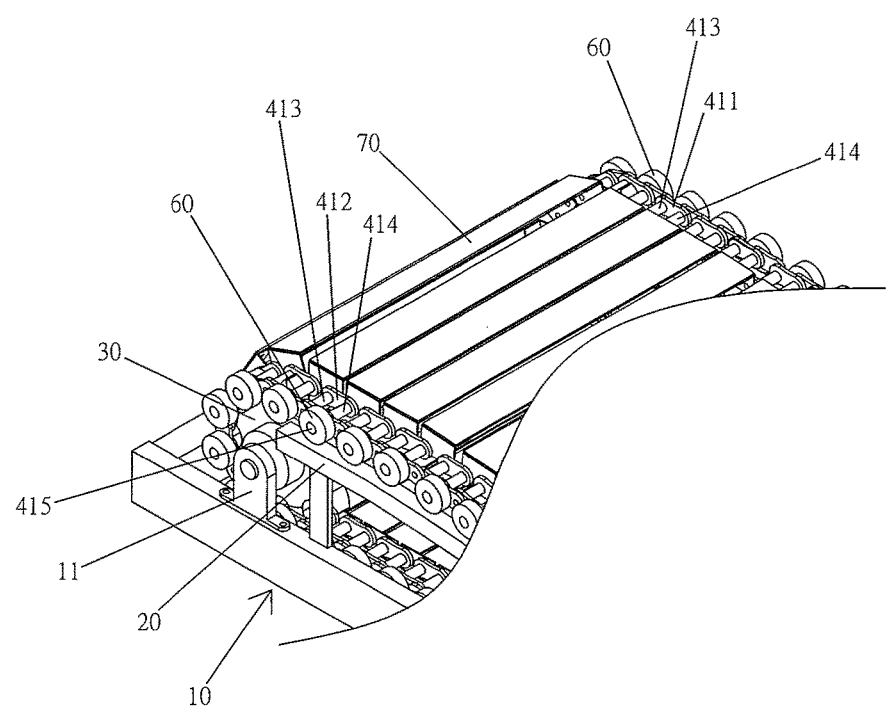
FIG. 3 is a locally enlarged view of the treadmill as shown in FIG. 1.
Figure 4:
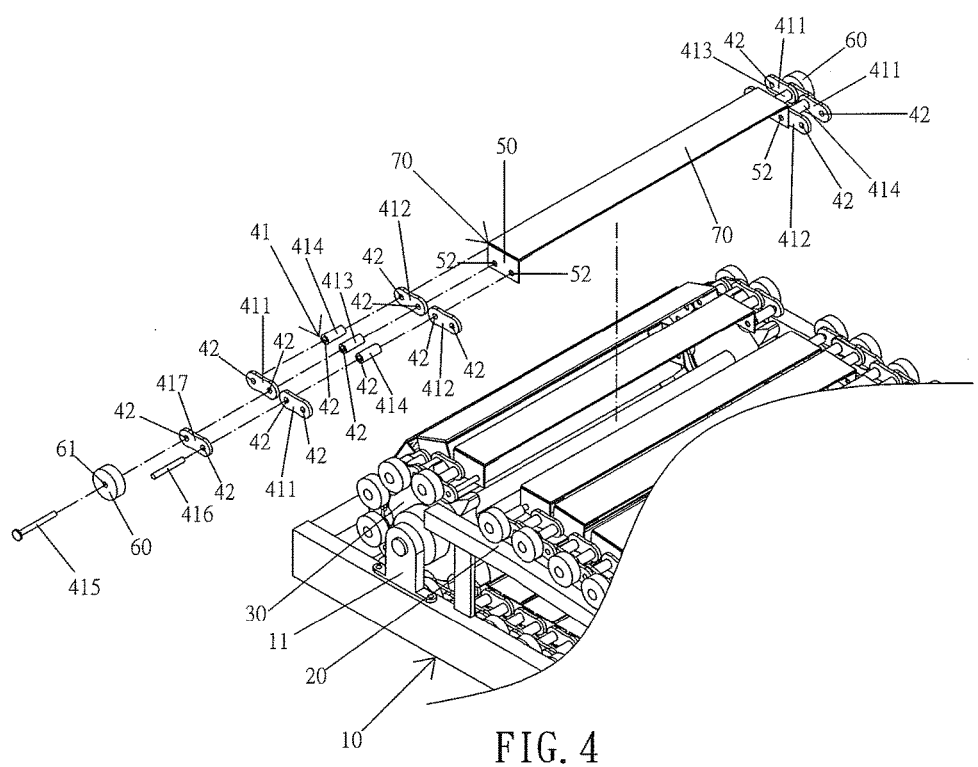
FIG. 4 is an exploded perspective view of the treadmill as shown in FIG. 3.
Figure 5:
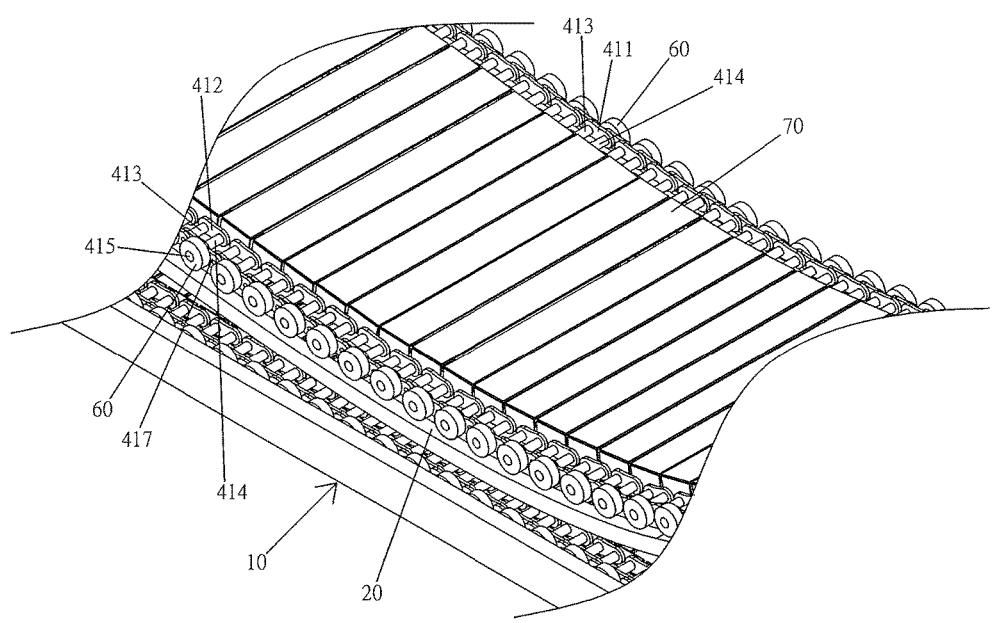
FIG. 5 is a locally enlarged view of the treadmill as shown in FIG. 1.

Referring to the drawings and initially to FIGS. 1-5, a treadmill in accordance with the preferred embodiment of the present invention comprises a frame 10 having two sides each provided with two sprockets 30, two slide rails 20 mounted on the two sides of the frame 10, two chains 40 engaging with the two sprockets 30 at the two sides of the frame 10 respectively and corresponding to the two slide rails 20 respectively, a plurality of elongate board 70 mounted between the two chains 40, and a plurality of rollers 60 mounted on each of the two chains 40.

The two arcuate slide rails 20 are parallel with each other. Each of the two slide rails 20 has an arcuate shape. Each of the two sprockets 30 at the two sides of the frame 10 is mounted on and supported by a pivot ear 11 which is secured on the frame 10. The two chains 40 are mounted around the two sprockets 30 at the two sides of the frame 10 respectively. Each of the two chains 40 has an endless shape. Each of the elongate board 70 has two ends each provided with a connecting member 50 connected with one of the two chains 40. Preferably, each of the elongate board 70 has a surface provided with a plurality of nonslip lines to provide an antiskid effect. The rollers 60 on each of the two chains 40 rest on one of the two slide rails 20. When the two chains 40 are rotated, the rollers 60 on each of the two chains 40 slide on one of the two slide rails 20.

Each of the two chains 40 includes a plurality of chain sets 41. Each of the chain sets 41 includes two first inner plates 412 mounted on the respective connecting member 50 of one of the elongate board 70, two second inner plates 411 spaced from the two first inner plates 412, two reinforcing spacers 413 and 414 each mounted between one of the two first inner plates 412 and one of the two second inner plates 411, an outer plate 417 linking the two second inner plates 411, and two shafts 415 and 416 each extending through the outer plate 417, one of the two second inner plates 411, one of the two reinforcing spacers 413 and 414, one of the two first inner plates 412 and the respective connecting member 50 of one of the elongate board 70, to combine the outer plate 417, the two second inner plates 411, the two reinforcing spacers 413 and 414, the two first inner plates 412 and the respective connecting member 50 of one of the elongate board 70. The two second inner plates 411 and the two first inner plates 412 are parallel with each other. Each of the outer plate 417, the two second inner plates 411, the two reinforcing spacers 413 and 414 and the two first inner plates 412 is provided with at least one shaft hole 42 allowing passage of the two shafts 415 and 416.

The connecting member 50 of each of the elongate board 70 is substantially L-shaped and has a side provided with two through holes 52 allowing passage of the two shafts 415 and 416 of one of the chain sets 41. The connecting member 50 is connected with each of the elongate board 70 by riveting or screwing. Each of the rollers 60 is mounted on one of the two shafts 415 and 416 and rests on the outer plate 417 of one of the chain sets 41. Each of the rollers 60 has a pivot hole 61 mounted on one of the two shafts 415 and 416 of one of the chain sets 41.

Figure 6:
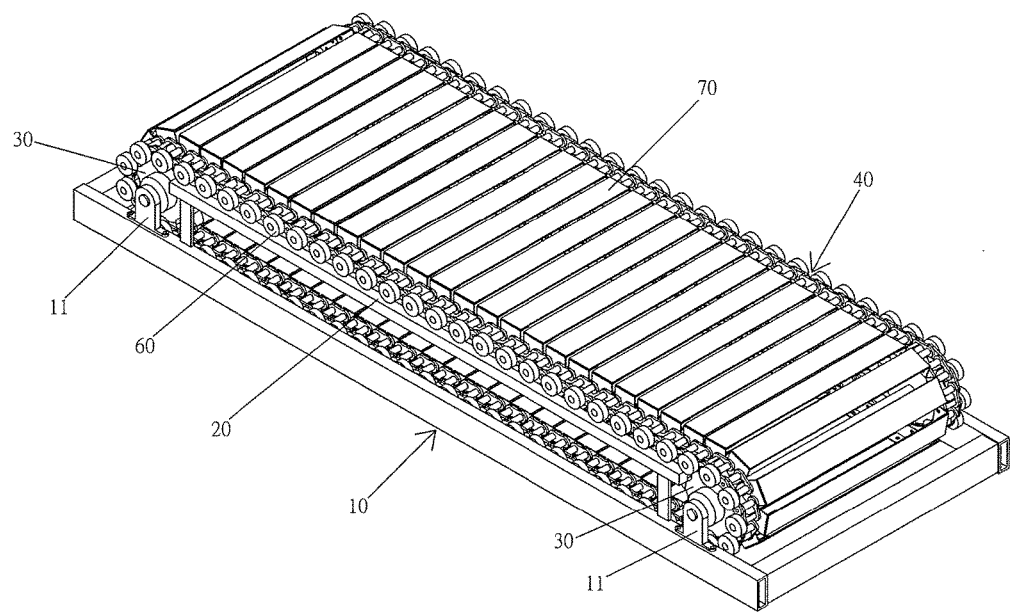
FIG. 6 is a perspective view of a treadmill in accordance with another preferred embodiment of the present invention.

Referring to FIG. 6, each of the two slide rails 20 is located at a horizontal linear state.

Accordingly, the two chains 40 engage with the two sprockets 30 at the two sides of the frame 10 respectively, while the rollers 60 are mounted on each of the two chains 40 and slide on one of the two slide rails 20, so that the treadmill has a track-type walking belt that has rotation and transmission of high precision and stability. In addition, each of the two chains 40 has a stabilized structure and is not worn out easily during a long-term utilization, thereby enhancing the lifetime of the treadmill, and thereby reducing the cost of maintenance. Further, the sprockets 30 are manufactured by stamping easily and simply, without needing a lathe working of a high price, thereby greatly decreasing the cost of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A treadmill comprising:
   a frame having two sides each provided with two sprockets;
   two slide rails mounted on the two sides of the frame;
   two chains engaging with the two sprockets at the two sides of the frame respectively and corresponding to the two slide rails respectively;
   a plurality of elongate boards mounted between the two chains; and
   a plurality of rollers mounted on each of the two chains;
   wherein:
   each of the elongate boards has two ends each provided with a connecting member connected with one of the two chains;
   the rollers on each of the two chains rest on one of the two slide rails;
   when the two chains are rotated, the rollers on each of the two chains slide on one of the two slide rails;
   each of the two chains includes a plurality of chain sets;
   each of the chain sets includes:
   two first inner plates mounted on the respective connecting member of one of the elongate boards;
   two second inner plates spaced from the two first inner plates;
   two reinforcing spacers each mounted between one of the two first inner plates and one of the two second inner plates;
   an outer plate linking the two second inner plates; and
   two shafts each extending through the outer plate, one of the two second inner plates, one of the two reinforcing spacers, one of the two first inner plates and the respective connecting member of one of the elongate boards.

2. The treadmill of claim 1, wherein each of the two slide rails has an arcuate shape.

3. The treadmill of claim 1, wherein the connecting member of each of the elongate boards is substantially L-shaped.

4. The treadmill of claim 1, wherein each of the outer plates, the two second inner plates, the two reinforcing spacers and the two first inner plates is provided with at least one shaft hole allowing passage of the two shafts.

5. The treadmill of claim 1, wherein:
   each of the rollers is mounted on one of the two shafts and rests on the outer plate of one of the chain sets; and
   each of the rollers has a pivot hole mounted on one of the two shafts of one of the chain sets.

6. The treadmill of claim 1, wherein the connecting member of each of the elongate boards has a side provided with two through holes allowing passage of the two shafts of one of the chain sets.

7. The treadmill of claim 1, wherein the connecting member is connected with each of the elongate boards by screwing.

8. The treadmill of claim 1, wherein the connecting member is connected with each of the elongate boards by riveting.

9. The treadmill of claim 1, wherein each of the elongate boards has a surface provided with a plurality of nonslip lines.

10. The treadmill of claim 1, wherein each of the two sprockets at the two sides of the frame is mounted on and supported by a pivot ear which is secured on the frame.

* * * * *